United States Patent [19]

Wennerstrom

[11] 4,027,920
[45] June 7, 1977

[54] DISTRIBUTOR

[75] Inventor: Jerald Meeker Wennerstrom, Canal Fulton, Ohio

[73] Assignee: The Babcock & Wilcox Company, New York, N.Y.

[22] Filed: Oct. 14, 1975

[21] Appl. No.: 622,353

[52] U.S. Cl. .............................. 302/28; 266/182; 302/59
[51] Int. Cl.² ...................................... B65G 53/34
[58] Field of Search .................. 302/28, 59, 17; 266/182

[56] References Cited
UNITED STATES PATENTS

| 2,674,499 | 4/1954 | Thayer | 302/59 |
| 2,695,197 | 11/1954 | Burtis | 302/59 |
| 2,945,724 | 7/1960 | McClure | 302/59 |
| 3,204,942 | 9/1965 | Matthys et al. | 302/28 |
| 3,689,045 | 9/1972 | Coulter et al. | 266/82 |
| 3,722,544 | 3/1973 | Westenberg | 302/28 |
| 3,728,872 | 4/1973 | Thore | 302/28 |

Primary Examiner—Evon C. Blunk
Assistant Examiner—Jeffrey V. Nase
Attorney, Agent, or Firm—J. Maguire; R. J. Edwards

[57] ABSTRACT

An improved distributor having a central inlet for receiving a stream of gas entrained particles to be divided into a plurality of effluent streams and including an open-ended standpipe disposed therein to maintain the central orientation of the incoming stream thereby attaining a pattern of recirculation which induces a steady flow and uniform distribution of the effluent streams.

4 Claims, 4 Drawing Figures

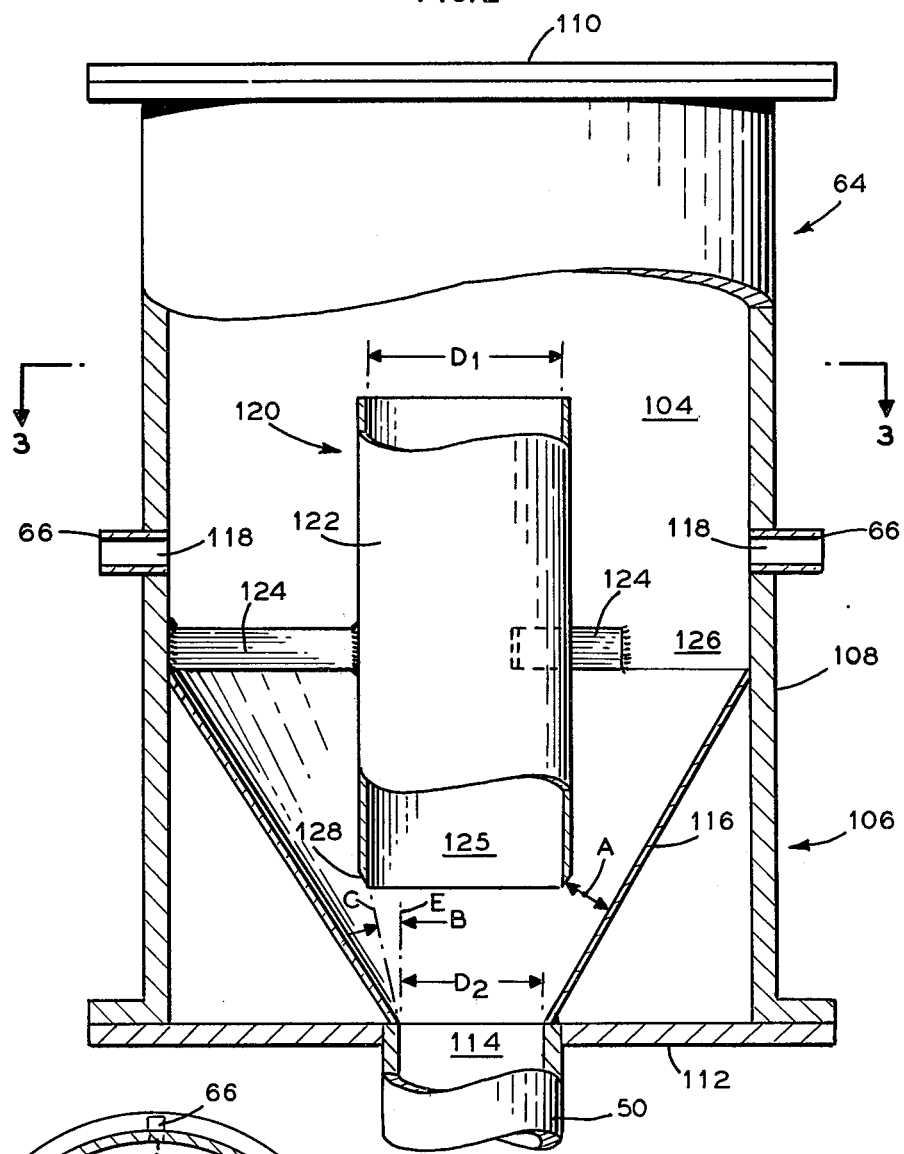
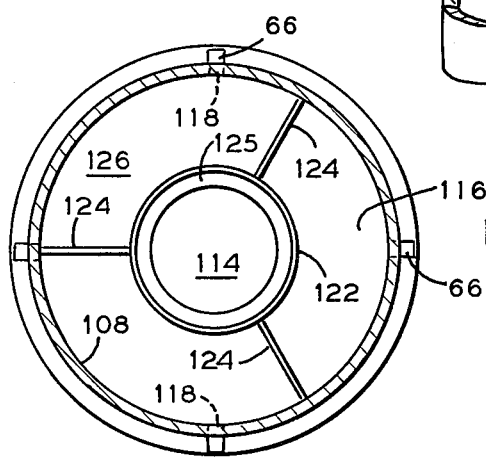

4,027,920

DISTRIBUTOR

BACKGROUND OF THE INVENTION

The present invention relates to a pneumatic transport system and more particularly to a distributor wherein gas entrained particles are divided into a plurality of effluent streams of substantially equal weight and density.

The prior art is exemplified by U.S. Pat. No. 3,204,942 which discloses an apparatus for distributing an incoming stream of gas entrained particles into a multiplicity of streams and comprising an unobstructed chamber having its upper end closed and its lower end formed with a central inlet and including a plurality of spaced outlets disposed along a common horizontal plane in the upright chamber wall. During operation of this known distributor, the jet effect of the incoming stream penetrates the full length of the chamber and impinges on its upper end thereby giving rise to a recirculation effect with a portion of the particle stream being discharged through the outlets while the remainder recirculates to the bottom of the chamber and forms, in equilibrium condition, a reservoir of particulate matter that is re-entrained in the incoming stream. This known distributor has encountered some difficulties in achieving the desired pattern of recirculation which requires that the incoming stream maintain a central orientation through the chamber before fanning out for discharge and recirculation. Recent experience has shown that deviation of the incoming stream from its central orientation results in pulsation and non-uniform distribution of the effluent streams.

SUMMARY OF THE INVENTION

The present invention discloses a distributor which provides a positive means for maintaining the central orientation of the incoming stream thereby attaining a pattern or recirculation which induces a steady flow and uniform distribution of the effluent streams.

Accordingly, there is provided a distributor comprising a vessel and an open-ended upright member centrally disposed within the vessel and defining an inner passageway therein. The upright member and vessel cooperate to form an outer passageway therebetween. The vessel has a plurality of spaced outlets opening to the outer passageway and an inlet disposed in spaced subjacent relation to the upright member. The inlet cross-sectional area of the inner passageway is greater than the inlet cross-sectional area of the vessel thereby assuring the passing of substantially all of the gas entrained particles through the inner passageway prior to discharge from the vessel outlets.

BRIEF DESCRIPTION OF THE DRAWINGS

FIG. 2 is a sectional side view of the distributor depicted in FIG. 1;

FIG. 3 is a plan view taken along line 3—3 of FIG. 2;

DESCRIPTION OF THE PREFERRED EMBODIMENTS

The distributor is herein described in conjunction with the preparation and conveying of air borne pulverized coal to a blast furnace. It should be recognized, however, that the disclosed distributor may also be used in conjunction with other systems for the distribution of any pneumatically transported particle-form material.

Figure 1:
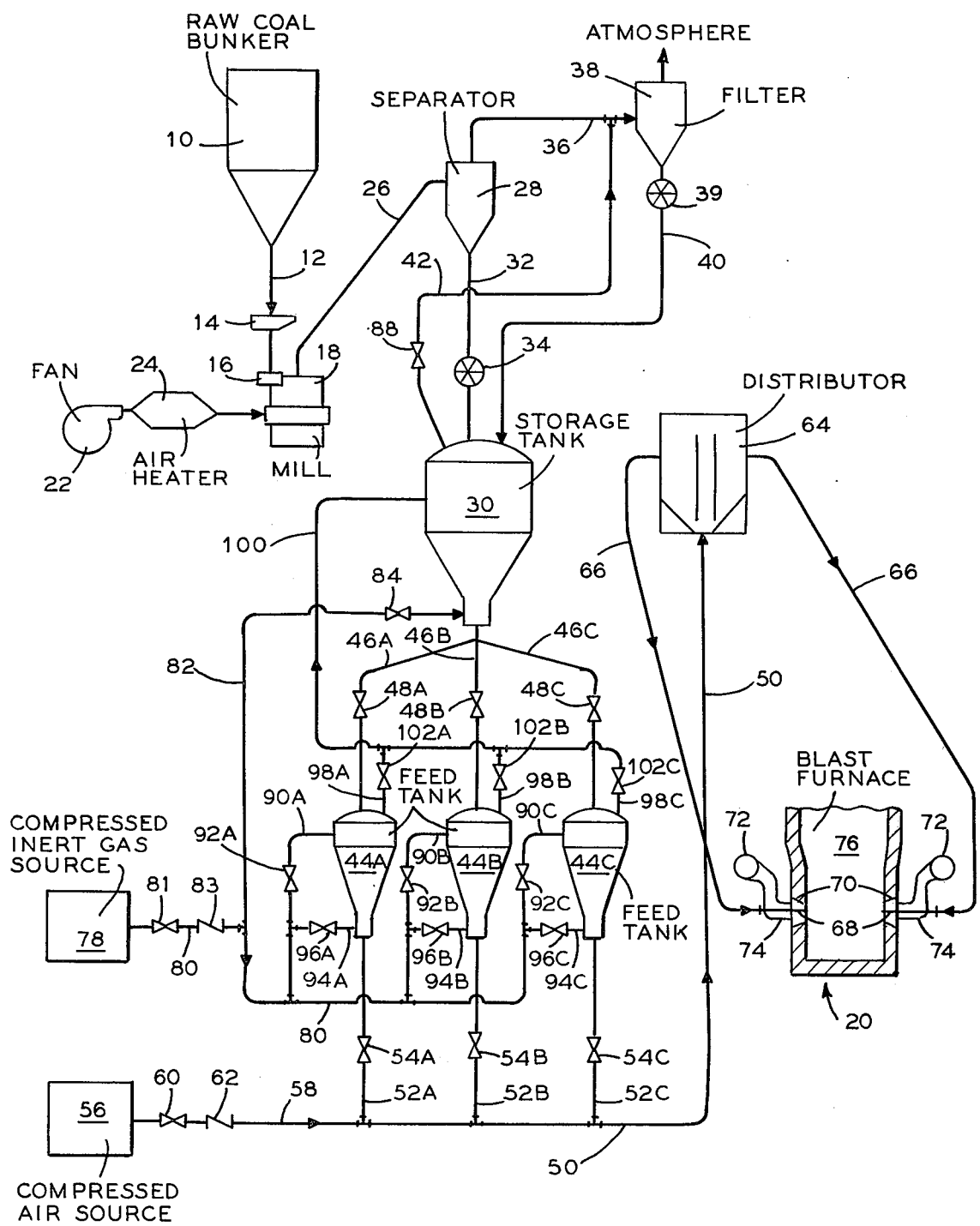
FIG. 1 is a schematic diagram of a blast furnace pulverized fuel preparation and transport system including a distributor embodying the invention.

FIG. 1 illustrates a coal preparation and transport system of the character generally disclosed in U.S. Pat. No. 3,689,045 and includes a raw coal bunker 10 which discharges through an outlet conduit 12. A gate valve 14 is installed in the conduit 12 and, when open, allows coal to gravitate to a feeder 16, the latter regulates the flow of coal to a mill 18 in response to system demand. The mill 18 grinds the coal to a consistency suitable for pneumatic transport to a blast furnace 20. Air is supplied to the mill 18 by a primary air fan 22. The air is passed through a heater 24 and is preheated prior to its entry into the mill 18. The heated air passing through the mill 18, dries the pulverized coal and conveys it through an outlet conduit 26 to a cyclone type separator 28. The coal-air mixture entering the separator 28 is centrifugally separated and the coal gravitates to a storage tank 30 via a discharge conduit 32, the latter being provided with a rotary valve 34. The minute coal fines which remain entrained in the primary air are carried along with the air, through a vent conduit 36 to a bag-filter house 38, or other functionally similar apparatus, and collected therein. The cleaned primary air leaving the bag-house 38 is vented to atmosphere while the collected fines gravitate to the storage tank 30 via a discharge conduit 40, the latter being provided with a rotary valve 39.

If desired, a plurality of pulverized coal preparation units can be operated in parallel to supply coal to the storage tank 30 since with multiple units, intermittent operation, maintenance, or emergency servicing of any single unit can be accommodated without necessitating a shutdown of the delivery system. In lieu of spare pulverizing capacity afforded by multiple coal preparation units, an auxiliary storage tank, not shown, can be provided. The auxiliary tank could be suitably connected to the conduits 32 and 40 to receive some or all of the pulverized coal output in excess of the then current needs of the blast furnace 20.

The tank 30 is suitably vented through conduit 42 so as to operate at atmospheric pressure and serves to provide sufficient storage of pulverized coal to supply a plurality of feed tanks 44A, 44B and 44C through corresponding distribution conduits 46A, 46B and 46C. The conduits 46A–C are provided with shutoff valves 48A, 48B and 48C, respectively, which, when open, allow the individual tanks 44A–C to be filled with pulverized coal.

The feed tanks 44A–C communicate with a pneumatic transport conduit 50 through corresponding outlet conduits 52A, 52B and 52C provided with respective shutoff valves 54A, 54B and 54C which can be selectively opened to permit coal flow from selected tanks 44A–C, one at a time, to the blast furnace 20 through transport conduit 50, and closed to isolate, from conduit 50, those tanks 44A–C other than the one currently selected to supply pulverized coal to the blast furnace 20.

The pressurized air required for pneumatic conveyance of the pulverized coal is supplied by a compressed air source 56 discharging through a conduit 58 which connects to the inlet end of transport conduit 50 and includes control and check valves 60 and 62, respectively.

The transport conduit 50 discharges into one or more distributors 64 from which a plurality of feed conduits 66 lead to individual tuyeres 70 of blast furnace 20 in a manner similar to that described in U.S. Pat. No. 3,204,942. The number of distributors 64 as well as the number of tuyeres 70 served by each distributor 64 can be varied according to the requirements of the blast furnace 20. The blast air supplied through the tuyeres 70 is heated in regenerative type stoves, not shown, to a temperature of about 1800° F and passes via a conduit, not shown, to a torus shaped bustle 72 and thence to the individual tuyeres 70 by way of gooseneck conduits 74. The coal-air stream from each feed conduit 66 is directed by corresponding nozzles 68 into the bosh 76 of the blast furnace 20 so that each stream is projected into the high temperature blast air being injected through the corresponding tuyere 70.

Inert gas is used for pressurizing and aerating the feed tanks 44A–C and also for aerating the storage tank 30. The choice of an inert gas is favored since it precludes the possibility of coal ignition within the storage and feed tanks. The inert gas is delivered by a compressed gas source 78 through a supply conduit 80 at a pressure sufficient to maintain coal flow from any given feed tank 44A–C into the transport conduit 50 at maximum anticipated blast furnace demand rate and against the combined transport system pressure drop and the pressure within the bosh 76. The gas supply conduit 80 includes a control valve 81 and a check valve 83. The aeration of the storage tank 30 is accomplished through conduit 82 which connects the tank 30 with the gas supply conduit 80 and includes a control valve 84. The venting of the storage tank 30 is accomplished through conduit 42 which connects the tank 30 with vent conduit 36 and includes a control valve 88. The pressurization of the feed tanks 44A–C is accomplished through corresponding conduits 90A, 90B, 90C which connect the tanks 44A–C with the gas supply conduit 80, respectively, and include control valves 92A, 92B and 92C. The aeration of the feed tanks 44A–C is accomplished through corresponding conduits 94A, 94B and 94C which connect the tanks 44A–C with the gas supply conduit 80 and respectively include control valves 96A, 96B and 96C. The venting of the feed tanks 44A–C is accomplished through corresponding lines 98A, 98B and 98C which connect the tanks 44A–C with a main vent conduit 100 and respectively include control valves 102A, 102B and 102C. The conduit 100 vents into the storage tank 30.

In the operation of the system, each of the feed tanks 44A–C is alternately filled, pressurized, and emptied to feed the blast furnace 20 in a predetermined cyclical sequence. For example, when tank 44A is feeding the blast furnace 20, tank 44B is on standby status, filled with coal and pressurized with inert gas, while tank 44C is being filled with coal from storage tank 30.

The aeration valves 96A–C are preferably left open during operation of the system to assure satisfactory fluidization of the coal within the respective tanks 44A–C.

The quantity of pulverized coal being delivered to the blast furnace 20 is regulated through the pressurization valves 92A–C and the vent valves 102A–C associated with whichever tank is feeding coal. In the event that the actual coal flow rate is less than the demand rate, the pressurization valve will open thereby raising the feed tank pressure to increase the coal flow rate. Conversely, should the coal flow rate be greater than the demand rate, the vent valve will open thereby reducing the feed tank pressure to decrease the coal flow rate.

The pressurized air used to transport the pulverized coal, from the discharge side of the feed tanks 44A–C to the blast furnace 20, is regulated through valve 60 to maintain conduit velocities which will assure steady flow and prevent the settling of coal while minimizing the quantity of relatively cold air being thus introduced into the blast furnace 20. The coal-air mixture is conveyed through conduit 50 to the distributor 64 which divides it into a plurality of effluent streams of substantially equal coal-air density and coal quantity. The coal-air streams leaving the distributor 64 are conveyed through respective conduits 66 to corresponding nozzles 68 for injection into the bosh 76 of blast furnace 20. The hot blast air which is introduced through the gooseneck conduits 74 into the tuyeres 70 mixes with the coal-air stream to promote rapid combustion of the coal.

Figure 4:
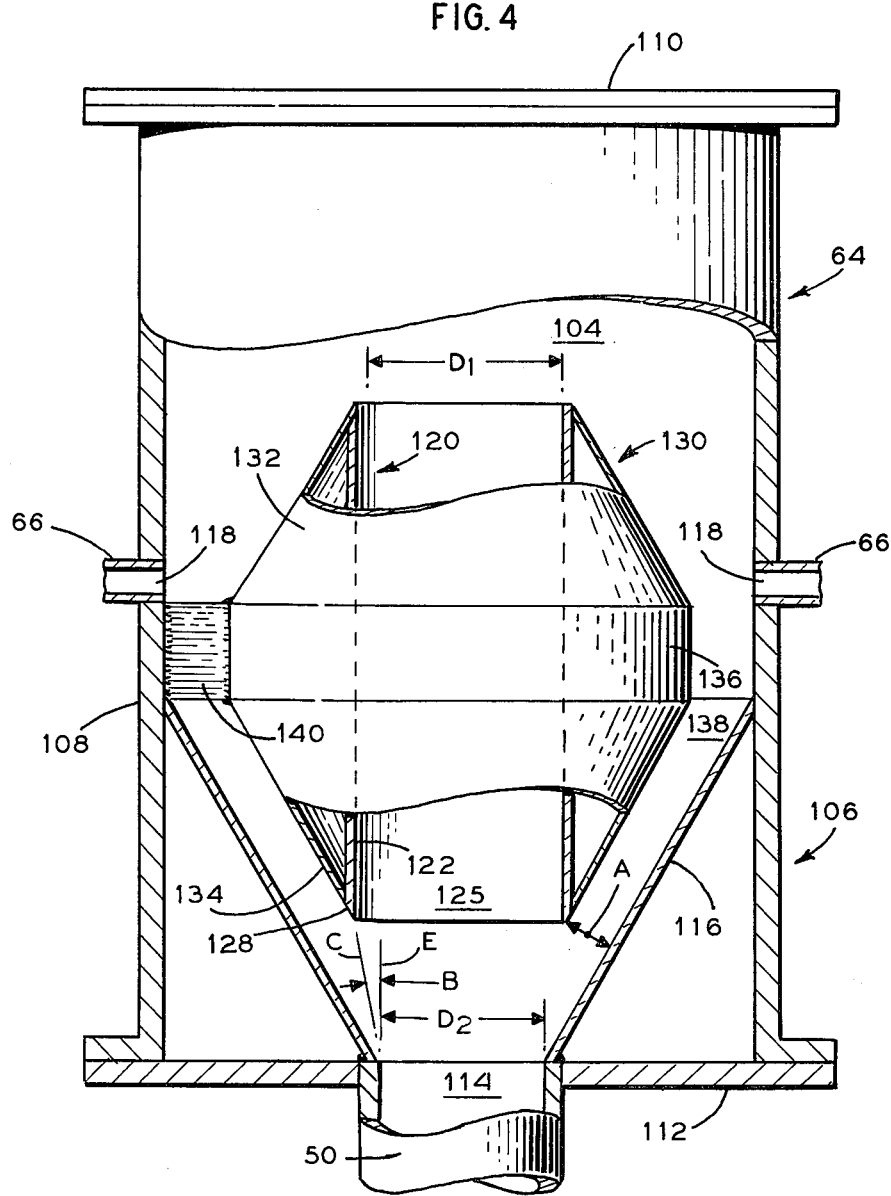
FIG. 4 is a sectional side view of an alternate embodiment of a distributor.

Referring to FIGS. 2 through 4, there are shown main and alternate embodiments of the distributor 64 whose like components include a vessel 106 having a vertically disposed tubular side wall 108, a top plate 110 and a bottom plate 112. A frusto-conical bottom 116 is provided at the lower end of vessel 106 and cooperates with the side wall 108 and the top plate 110 to form an upright chamber 104 which communicates with the discharge end of conduit 50 through a central opening 114 formed in the bottom plate 112. The frusto-conical bottom 116 is located in surrounding relation to the inlet opening 114 to avoid objectionable accumulation of coal and to promote recirculation thereof into the incoming coal-air mixture. A plurality of equi-sized outlet openings 118 are formed in the vessel side wall 108 and are preferably disposed in uniform spaced relation to one another along a common horizontal plane. The openings 118 are connected for discharge to corresponding feed conduits 66.

The distributors 64 include an upright open-ended member or standpipe 120 preferably of uniform horizontal circular cross section throughout and located within the chamber 104 in spaced coaxial relation to the vessel inlet 114. The standpipe 120 is formed of a vertically disposed tubular side wall 122 which is, in the embodiment of FIG. 2, fixedly connected to the vessel wall 108 through a plurality of laterally spaced support members 124. The side wall 122 defines a vertically oriented centrally disposed inner passageway 125 and cooperates with the vessel wall 108 and the frusto-conical bottom 116 to form an outer annular passageway 126 which communicates with the distributor and standpipe inlet and outlet openings. The lower end face 128 of side wall 122 is bevelled in a direction parallel to the slope of the frusto-conical bottom 116 to further enhance the recirculation of coal into the incoming coal-air mixture.

Referring specifically to the embodiment of FIG. 4, the side wall 122 of standpipe 120 is surrounded by a filler piece 130 which is fixedly connected to the pipe 120, preferably, by the seal-welding together of adjoining ends. The filler piece 130 is formed of upper and lower frusto-conical sections 132 and 134 interconnected by a cylindrical transition section 136 and convergent toward the respective standpipe ends. The filler piece sections 132, 134 and 136 cooperate with the vessel wall 108 and the frusto-conical bottom 116 to form an outer annular passageway 138. The filler piece 130 is fixedly connected to the vessel wall 108 through a plurality of laterally spaced support members 140 and has its lower section 134 sloped in a direction parallel to the distributor bottom 116 and coplanar with the bevelled end face 128 of side wall 122.

In accordance with the invention it has been established that satisfactory operation of the distributor 64 requires that the horizontal cross-sectional area of the inner passageway 125 be sized to maintain flow velocities which assure continuous and positive upward movement of the coal-air mixture through the standpipe 120 over the system operating range. It is also required that the spacing separating the respective bottoms of standpipe 120 and chamber 104 be sized so as not to prevent the recirculation of coal into the incoming coal-air mixture. It is further required that the horizontal cross-sectional area of the inner passageway 125 be greater than the horizontal cross-sectional area of the vessel inlet 114 thereby assuring that all of the incoming coal-air mixture as well as the recirculated coal passes through the standpipe 120 and maintains the central orientation necessary for orderly and uniform distribution through the outlet openings 118.

Referring specifically to the embodiments of FIGS. 2 and 4 and as a result of a series of tests, it has been established that continuous and positive upward movement of the coal-air mixture through the standpipe 120 is assured by maintaining a minimum flow velocity of 3000 feet per minute and that optimum operation can be achieved at a velocity of 3600 feet per minute. Further tests established that continuous and positive recirculation of coal requires a minimum spacing of 1 inch across the narrowest span as indicated by line A extending between the standpipe bevelled edge 128 and the chamber bottom 116. Still further tests established that substantially all of the recirculated coal and incoming coal-air mixture passes through the standpipe 120 where the size ratio between the inner passageway diameter $D_1$ and the vessel inlet diameter $D_2$ is such that the angle B, formed between the imaginary plane C joining the respective inner peripheral edges of inner passageway 125 and vessel inlet 114 and the imaginary coplanar extension E of the inner periphery of the vessel inlet 114, is at least 7°. This limitation may be satisfied by adjusting the distance separating the respective bottoms of standpipe 120 and chamber 104, subject to the minimum requirement of maintaining a 1 inch spacing across the narrowest span therebetween, and/or by increasing the diameter $D_1$ of the inner passageway 125, subject to the requirement of maintaining a minimum flow velocity of 3000 feet per minute through the passageway 125.

In the operation of the distributor 64, a mixture of air and pulverized coal is introduced axially into the chamber 104 through the inlet 114. The incoming coal-air mixture maintains its central orientation by flowing through the standpipe 120, and exits therefrom in an orderly fashion to provide a uniform downward flow through the outer passageway 126. The coal-air mixture flowing in passageway 126 or 138 is discharged in substantially equal quantities and uniform densities through the outlet openings 118 into the conduits 66 with a portion of the coal forming, in equilibrium condition, a reservoir of coal whose upper and lower levels are continuously swept by the outgoing and incoming coal-air mixtures, respectively.

While is accordance with the provisions of the statutes there is illustrated and described herein a specific embodiment of the invention, those skilled in the art will understand that changes may be made in the form of the invention covered by the claims and that certain features of the invention may sometimes used to advantage without a corresponding use of the other features.

The embodiments of the invention in which an exclusive property or privilege is claimed are defined as follows:

1. In combination with a pneumatic transport system having at least one distributor and means for passing gas entrained particles therethrough, said distributor including an upright cylindrical vessel, an upright open-ended cylindrical member coaxially disposed within said vessel and defining therein an inner passageway of uniform horizontal cross-sectional area throughout, the upright member and vessel being spaced from one another to form an outer annular passageway therebetween, the vessel having a plurality of uniformly spaced outlets opening to said outer passageway and a circular inlet disposed in coaxial and subjacent spaced relation to said upright member, support means connecting the upright member to the vessel, an inverted frusto-conical filler piece disposed within the vessel and defining therein a sloped bottom extending downwardly from below the vessel outlets to the vessel inlet perimeter, conduit means for conveying the gas entrained particles to the distributor, said conduit means terminating at the circular inlet, and the horizontal cross-sectional area of the inner passageway being greater than the horizontal cross-sectional area of the vessel inlet thereby assuring the passing of substantially all of the gas entrained particles through the inner passageway prior to discharge from said vessel outlets.

2. The combination according to claim 1 including the upright member having a lower end face bevelled in a direction parallel to the sloped bottom within said vessel.

3. In combination with a pneumatic transport system having at least one distributor and means for passing gas entrained particles therethrough, said distributor including an upright vessel, an upright open-ended member coaxially disposed within the vessel and defining an inner passageway therein, an annular filler piece disposed in surrounding and fixed abutting relation to the upright member and comprising frusto-conical end sections convergent toward the respective ends of the upright member, the end sections being interconnected by a cylindrical transition section, the filler piece and vessel being spaced from one another to form an outer passageway therebetween, the vessel having a plurality of spaced outlets opening to the outer passageway and an inlet disposed in subjacent spaced relation to the upright member, said upright member being formed with an inlet facing the vessel inlet, and the upright member inlet having a horizontal cross-sectional area which is greater than the horizontal cross-sectional area of the vessel inlet thereby assuring the passing of substantially all of the gas entrained particles through the inner passageway prior to discharge from said vessel outlets.

4. The combination according to claim 3 including a plurality of laterally spaced support members connecting the filler piece to said vessel.

* * * * *